United States Patent Office 2,796,343
Patented June 18, 1957

2,796,343

PROCESS FOR THE HYDROMETALLURGICAL PRECIPITATION OF NICKEL AND COBALT

John J. Shaw, Brooklyn, and Felix A. Schaufelberger, Rye, N. Y., assignors to Chemical Construction Corporation, New York, N. Y., a corporation of Delaware No Drawing. Application March 19, 1956,
Serial No. 572,234

9 Claims. (Cl. 75—109)

This invention deals with the hydrometallurgical precipitation as metal powder of non-ferrous metals from solutions of their dissolved salts by the action of reducing gas at elevated temperature and superatmospheric pressure. More specifically, it relates to an improved process of producing such metals as nickel and cobalt as metal powder having suitable physical and chemical characteristics.

In particular, it is an object of this invention to develop a process capable at below 100° C. of precipitating nickel and cobalt metal powder from a solution containing dissolved salts thereof. Moreover, the process should be capable of precipitating such metal powder in suitable condition for use as active seeding material in treating additional amounts of solution under the same or different reducing conditions.

In general, these objects have been attained by carrying out the metal-producing reduction in the presence of a small amount of a catalyst consisting of a small amount of a soluble salt of a metal having an atomic number 22–24 inclusive. Reduction is thereby obtained under a positive partial pressure of reducing gas at from about 50° to 100° C., from an ammoniacal, ammonium salt solution. The salt used as a catalyst is usually a relatively small amount of a sulfate of titanium, vanadium or chromium in their lower valent state. Under these conditions it is found that a satisfactory metal powder, small in average diameter, is obtained in thirty minutes or less at temperatures as low as 50° C. Precipitated powder is in a highly active state, excellently suited for use in seeding subsequent reductions.

In recent years, there has been a continually increasing interest in the hydrometallurgical recovery of nonferrous metals, particularly nickel and cobalt, from various sources, i. e., ores, ore concentrates, plant by-products and secondary metals. Various improvements have been made, not only in leaching methods, but also in methods of precipitating metal powders from solution and in overall processes combining these features.

Since it is the precipitation operation with which this present invention is concerned, some general facts should be noted. Treatment of solutions at elevated temperatures and superatmospheric pressures with a suitable reducing gas to precipitate metal is usually referred to as "reduction." However, there are certain stages in reduction at which different results, for example different product characteristics such as size or density, may be desired. Therefore, in various situations, reduction may be conducted under different conditions.

In discussing such operations, various designations have been used with somewhat different intent as to meaning. Therefore, in the present specification and claims, the following terms will have the following meanings:

Nuclei—fine particles, precipitated in and/or grown from solution, on which metal can be deposited.

Seed—fine metal particles, including preformed nuclei, usually but not necessarily of the metal to be recovered, which when present in the solution being treated provide surfaces on which precipitated metal may deposit, even under solution conditions at which nuclei do not form readily.

Reduction—the generic designation of the overall operation in which elemental metal is obtained from a metal salt.

Nucleation—the initiation of, reduction to, and formation of nuclei.

Precipitation—that stage in reduction when metal is depositing on nuclei or on seed under conditions at which nuclei can form, usually resulting in particles of relatively low density.

Densification—reduction in the presence of seed powder under conditions unfavorable for nucleation, whereby precipitated metal particles are obtained having a greater apparent density than can be obtained under nucleation conditions.

In the terms of these definitions, then, the present invention deals with the preparation of "nuclei" or "seed" which is utilized in subsequent "reduction" reactions, usually for purposes of "densification."

In seeding a solution, seed must be provided in adequate amount and be sufficiently fine in particle size. It is desirable to employ substantially the same metal which will constitute the product. This greatly simplifies many production problems, particularly when metal is to be produced continuously. As a result, many different attempts have been made to produce fine metal particles for use as seed. These include such operations as: mechanical grinding of larger particles; precipitation by such reducing agents as hypophosphite, hydrazine and like which are stronger than hydrogen; decomposition of certain compounds such as $Ni(CO)_4$; and the limited reduction of acidic solutions. Recycling product nickel powder from some previous reduction has also been suggested.

Preparation of seed metal by gas reduction of metal salt solutions was not generally considered as promising for commercial development because it involved the same problems that the use of seed was intended to overcome. To accomplish reduction to seed metal requires the presence of some satisfactory nucleating material on which metal can deposit. If seed precipitation by gas reduction is not properly nucleated, reduction may be too slow and/or too incomplete but result in the formation of useless deposits on the walls of the reduction vessel.

Therefore, when suitable seed metal is not available for seeding, other procedures must be used. As shown in U. S. Patent 2,734,821, self-nucleating solutions can be prepared if sufficient care is used. According to the present invention, as noted above, a procedure has been developed which simplifies this operation. Moreover, it enables reduction of a non-seeded solution to be more quickly and easily carried to completion at 50°–100° C., to obtain good seed powder.

The present process does involve the addition to the solution of a salt of an extraneous metal. At least some of the latter will be in the metal powder. However, this does not cause difficulty in production. It is an advantage of the invention that the amount of such material required is not as large as in similar proposals but is so small that no problems of purification are ordinarily involved. Moreover, the substantially catalytic effect obtained in seed precipitation and the increased activity as seed of resultant precipitated metal are surprisingly great.

The concept of adding a salt of a different metal to improve nucleation is not new. Stannous, cerous and manganous salts have been proposed. Ferrous salts have been used extensively. It was believed that these ions when present in the solution being treated in some way acted either as reducing agents or reduction promoters. Whether this assumption is correct or not, obtaining seed precipitation at 50°–100° C. by the proper use of the specific metal salts of the present invention does not seem to be explained thereby. Moreover, the present invention offers a marked improvement over the use of ferrous salts according to the prior art.

While the exact manner in which the added salts of the present invention produce the improved results obtained, there is no question of equivalency of materials. Manganous salts in the prior art were shown as equivalent to iron salts. Although the reason therefor is not clear, manganous salts, for example, have substantially no beneficial effect when substituted for the titanous, vanadous or chromous salts in the process of the present invention. As a result, it is highly surprising that in the present process the use of the specific salts produces such excellent results. Iron has atomic number 26; manganese number 25. It would therefore be expected that dropping back to chromium, vanadium and titanium, which have atomic numbers 24, 23 and 22 respectively, would prove them of even less utility than manganese salts. Unexpectedly, this is not the fact. Salts of the metal of the next lower atomic number (chromium atomic number 24) are not only useful under conditions where manganous salts are not but are even more effective than ferrous salts.

Although it is not intended that the invention be limited thereby, it is believed that the improved result may be explained. For purposes of illustration, an ammoniacal solution of nickel or cobalt sulfates which also contains ammonium sulfate presents all the typical features and problems. Taking such a nickel solution as illustrative, it will be found that when the hydrogen ion content is suitable for reduction hydrolysis will be initiated. Hydrolysis will under different solution conditions produce different results. Although solubility of the hydrolysate differs for different solute contents, it is usually precipitated. In some cases, the precipitate is easily reduced to metal of good quality. In other cases, the hydrolysate will be found to be substantially unreducible.

Very little is definitely known about the exact chemical nature and structure of hydrolysates which precipitate under the conditions of the present invention. For example, when an ammoniacal solution of soluble salts of nickel or cobalt such as is encountered in commercial use is placed in a pressure vessel and heated, hydrolysis occurs, even in solutions strongly buffered with ammonium sulfate or carbonate. Hydrolysis apparently starts even below about 100° C. and increases in rate with increases in temperatures to about 200°–250° C. or more such as have been previously used in hydrogen reductions. However, hydrolysis is slow, as compared, for example, with reduction, and is by no means complete by the time the solution reaches the higher temperatures.

An exact discussion is extremely difficult because the nature of these precipitates is so highly complex. They do not even form sufficiently definite patterns for X-ray study. For purposes of designation herein, they will be referred to as "hydroxides" even though precipitation of pure metal hydroxides is rare at the pH condition usually encountered. They are probably a mixture of basic compounds which together comprise some form of complex salt.

In the co-pending application of one of the present inventors Felix A. Schaufelberger with W. R. McCormick, Serial No. 571,893, filed March 16, 1956, it is shown that a basic nickel compound may be precipitated from such a nickel solution. As shown therein, the mol ratio of dissolved metal to $NH_3$ is adjusted to provide an excess and the solution is buffered with the correct amount of an ammonium salt. Excess ammonia is then reduced until hydrolysate in amount equivalent to about one to ten g./l. of the metal will be precipitated in situ as a fine suspension when the solution reaches reduction temperature. This hydrolysate appears to act in some way as a nucleation promoter. Reduction is easily carried to 99% completion when this amount is present, resulting in precipitation of excellent seed powder. Where hydrolysate is not precipitated prior to initiation of reduction, the latter is not completed, even after several hours and the product is worthless for seeding.

When this nucleating effect is considered along with the previously noted fact that different hydrolysates differ in susceptibility to reduction, it would appear possible that the nucleating activity, if any, of a hydrolysate could also be modified. Therefore, it is thought possible that the added extraneous metal ions of the present invention act in some way to coprecipitate as a hydrolysate of increased activity. Whether this is a correct assumption or not, the fact remains that the unexpectedly improved results are obtained when the effect of the prior art manganous ions is negligible and ferrous ions is only moderate, at the reduction temperature of the present process.

In general, the specific nature or origin of the solution to be reduced may be considered as independent of the present invention. From some source, an aqueous solution of soluble salts of the non-ferrous metals is obtained. Usually this solution will have been obtained by some known per se leaching operation of a suitable ore, ore concentrate, metallurgical plant by-product or secondary metals.

While the metals of interest which may be reduced according to the present invention may include substantially any non-ferrous metal having an oxidation-reduction potential between those of cadmium and silver, inclusive, and which is capable of forming with ammonia a complex ion that is readily reduced to elemental metal with a suitable reducing gas, the metals encountered will be cobalt and nickel. Copper, being more easily reduced under a wider range of conditions, the need for a nucleating promoter is not so great. It is with the recovery of cobalt and nickel, therefore, that the present invention is particularly concerned.

The non-metallic ion which goes to make up the metal salt to be reduced may be of any inorganic acid or strong organic acid provided it forms a soluble salt of the metal and is not reduced under precipitation conditions. Generally, these will be sulfates, and less often carbonates. The invention has its greatest applicability in the treatment of nickel and/or cobalt sulfate solutions however obtained. Particularly when using leaching of ores or concentrates as a method of preparing the solution, the latter will contain varying amounts of ammonium sulfate or ammonium carbonate and it is contemplated that one or both of these materials may be and usually are present.

A typical feed solution may be considered as an aqueous ammoniacal solution containing dissolved salts, illustratively sulfates, of nickel, cobalt and ammonia. Such may contain as high as 150 grams per liter of dissolved metal at ambient conditions but this is unlikely in practice. A solution containing less than about 5–10 grams per liter is ordinarily uneconomical to treat commercially without first using some means of concentrating the solutes content. A typical solution found in practice will usually contain from about 20–80 grams per liter of combined nickel plus cobalt. Reduction may be carried out using any suitable, sulfur-free reducing gas such as carbon monoxide, hydrogen or a combination of them. In general, however, hydrogen, when it can be obtained, is definitely preferable. Reduction may be carried out at a temperature as low as about 50° C. Excellent results can be obtained in from about 2–20 minutes at 75°–95° C. Since ambient plant temperatures for these liquors is usually about 60°–80° C., no added heat is necessary, this being a particular advantage of the invention.

At least sufficient total pressure, including the reducing gas over pressure, should be used to maintain the ammonia in solution at the reaction temperature. Since lower temperatures are used, pressures much less than those required to prevent boiling as in the prior art can be used. A positive partial pressure of the reducing gas is necessary to maintain reduction. It should not be less than about five p. s. i. g. at the end of reduction. Increasing the pressure of hydrogen increases the reaction rate. Therefore from about 50 to about 200 p. s. i. g. are better and if so desired, they can be much higher. Unnecessarily high temperatures should be avoided when time permits. It is a further advantage of this invention, moreover, that reduction may be carried out not only at lower temperatures but at much lower total pressures than previously necessary.

The present process is of advantage when reduction is carried out on the basic side. Therefore, it is necessary to furnish enough ammonia to maintain a basic pH. In addition, there must be sufficient ammonia present to form a reducible metal ammine ion. In general, there should not be less than about 1.7 mols of so-bound $NH_3$ per mol of dissolved metal. The preferred range for nickel ammines is from about 1.7 to about 3.0 although it may be higher. In cobalt ammines, the range preferred is from about 2.8 to about 4.5 but again it may be higher. Therefore, the ammonia content of the solution must be enough to produce a basic pH, preferably at above about eight and in addition form with the dissolved nickel and/or cobalt a metal ammine of the type $Me(NH_3)_x^{++}$ where $x$ is from about 1.7 to about five or six.

As noted above, a buffering salt, usually ammonium sulfate will be present as a result of the prior history of the solution. In general there should not be less than about 0.2 mol per mol of dissolved metal. There may be much more, in some cases up to about five mols. However, if this ammonium salt content is originally too high, there may be a tendency to salt out other solutes. If so, it should be reduced by crystallization or the like before starting reduction. If less than about 0.2 mol, it usually should be increased, either by direct addition or by neutralizing ammonia or acid.

As previously noted, the salt is usually the sulfate, therefore the extraneous added metal salt is also usually a sulfate. Actually, this is not critical and if the salt is soluble in the solution, the negative ion need not be the same as that in the salt of the metal of interest. The added extraneous metals of this invention are all polyvalent metals. To be effective, they must be used in a lower valent state so that the ions added will be present as $Cr^{++}$, $Ti^{+++}$ or $V^{+++}$.

Under the operating conditions before initiating reduction, there may be an undesirable tendency for one or more of the solutes to oxidize the extraneous added metal to its higher valent state. This introduces a difficulty in accurately determining the minimum necessary amount. It has been found that about 0.1 g./l. of the added salt is about a practical minimum. Increasing the amount within reasonable limits is of benefit in insuring that an effective amount in the lower valent state be present. Adding too much may introduce any excessive content in the product metal and should be avoided. Added amounts up to about 0.5 g./l. is about the usual upper limit.

Cobalt is more easily oxidized to a higher valent state than is nickel. Therefore, dissolved cobalt is usually at least partly in the cobaltic state due to the use of oxidizing conditions during leaching. When cobaltic ions may be present, some precaution should be taken to insure against their premature oxidation of the added metal to a higher valent state. Where powdered cobalt from previous operations is available, the simplest method is to have small amounts present in the reduction vessel. Any finite amount which remains undissolved is sufficient. If such metal powder is not available, a small amount of some reducing agent such as hydroquinone or the like should be provided. This problem is less pressing for predominantly nickel-bearing liquors but the same precautions are desirable.

The advantages and practice of the present invention are further set out in the following examples which are intended for illustrative purposes. Unless otherwise indicated, parts and percentages are on a weight basis.

Salts of the extraneous metals to be added to the solution are not readily available in the lower valent state. Several methods are known for their production. One such is by reducing a dissolved salt in the higher valent state with a zinc amalgam. This usage may be illustrated by the following examples.

EXAMPLE 1

Five parts of $Cr_2(SO_4)_3$ were taken up in eighty parts of hot water and treated at about pH 2 with zinc amalgam. After standing for about two hours, the resultant solution is used to provide $Cr^{++}$ ions in Ni and Co reduction operations.

EXAMPLE 2

Three parts of $TiCl_4$ and sufficient HCl in 80 parts of water to produce a pH of about 2 is added to zinc amalgam in an open vessel and allowed to stand about two hours. Resultant liquor is used to provide $Ti^{+++}$ ions during Ni reductions.

In order to show the problem encountered in the absence of a nucleation promoter the following examples may be taken as illustrative.

EXAMPLE 3

About 1500 ml. of a liquor substantially free of iron, copper and cobalt, containing about 50 g./l. of Ni as nickel sulfate, and 67 g./l. of $(NH_4)_2SO_4$ and having an $NH_3$/Ni mol ratio of about 2, is heated to about 175° C., pressurized to about 700 p. s. i. with $H_2$ and stirred until reduction is substantially complete. In different runs from about 200 to about 400 minutes are required. About five percent of the nickel metal is obtained as powder, the remainder plated on the vessel.

EXAMPLE 4

About 1500 ml. of a liquor containing about 45 g./l. of cobalt, 2.3 g./l. of Ni, 30 g./l. of $(NH_4)_2SO_4$ and having an $NH_3$/Co mol ratio of about 3 is heated to about 200°–210° C. for about 200 minutes. Reduced liquor still contained about 25 g./l. of Co.

To illustrate the prior art use of ferrous ions, the following examples are given.

EXAMPLE 5

Example 3 is repeated adding about one g./l. of $Fe^{++}$ ions as ferrous sulfate. In different runs, 45 to 60 minutes were required to obtain substantially complete reduction to light flocculent powder.

EXAMPLE 6

Example 5 is repeated using about two g./l. of $Fe^{++}$ ions. In from 28–35 minutes complete reduction is obtained.

EXAMPLE 7

Example 4 is repeated adding to the solution about one g./l. of $Fe^{++}$ ions as ferrous sulfate. After about 45 minutes, reduction to a light powder is substantially complete.

EXAMPLE 8

To illustrate the increased effectiveness of the salts of the present invention, Example 5 is repeated substituting 0.5 g./l. of $Cr^{++}$ ions for the $Fe^{++}$ ions. At about 98° C., reduction is substantially completed in about nine minutes.

EXAMPLE 9

Example 7 is repeated substituting about 0.34 g./l. of $Cr^{++}$ for the one g./l. of $Fe^{++}$ ions. Reduction is substantially completed at about 80° C. in about nine minutes.

EXAMPLE 10

About 1500 parts by volume feed liquor containing as sulfates: 45 g./l. of Co, 2.3 g./l. of Ni and 0.79 g./l. of Ca; about 30 g./l. of $(NH_4)_2SO_4$ and having an $NH_3/Co$ mol ratio of about 3 together with about 8 g./l. of densified cobalt powder previously produced is charged to an autoclave at about 23° C., heated to about 205° C. and pressurized to about 800 p. s. i. g. with hydrogen. Temperature and pressure were maintained with agitation for about two hours after which the vessel is cooled, pressure-relieved and the contents sampled. Reduction is not complete and considerable deposition on the agitator apparent.

To an additional charge of 1500 parts feed liquor and 8 g./l. of cobalt powder used in Example 10 at about 23° C. is added to about 0.34 g./l. of $Cr^{++}$ as chromous sulfate, and the solution is charged to an autoclave which is pressurized to about 700 p. s. i. with hydrogen and heated at about 80°–82° C. for thirteen minutes. About half of the reduced charge is blown down, pressure-relieved, cooled and sampled. Cobalt reduction is 99.7 complete to a fine, almost colloidal, black powder. The remaining half charge is held in the autoclave under the residual overpressure.

About 750 parts of additional feed liquor from Example 10 was added to that portion of slurry held in the autoclave under pressure. A first densification was carried out under 750 p. s. i., maintained with hydrogen at a temperature of about 80°–92° C. for 17 minutes with agitation. About 1200 parts of reduced liquor was blown down and replaced with 1200 parts of additional feed liquor and reduction was carried out thereon. This was repeated until six densifications were completed with the residual pressure maintained between runs. Results are shown in the following table.

*Table I*

| Densification No. | Aver. Temp. (° C.) | Aver. Press. (p. s. i. g.) | Time (Minutes) | Percent Co Reduced |
|---|---|---|---|---|
| 1 | 82 | 750 | 17 | 99.7 |
| 2 | 80 | 750 | 13 | 99.6 |
| 3 | 81 | 750 | 14 | 99.6 |
| 4 | 82 | 750 | 20 | 99.8 |
| 5 | 82 | 750 | 22 | 99.8 |
| 6 | 82 | 750 | 9 | 99.8 |

Product powder, after washing, analyzed 99.1% Co, 0.012% Cr, 0.74% Ni and had negligible contents of Ca and S. Its apparent surface area was about 1.36 square meters per gram.

EXAMPLES 11–16

Feed liquor contained 60 g./l. of Ni as nickel sulfate, about 30 g./l. of $(NH_4)_2SO_4$ and an $NH_3/Ni$ mol ratio of about three. To samples of about 1500 parts by volume are added ferrous, stannous and manganous sulfates to show the results obtainable in accordance with the prior art and, for comparison, chromous sulfate of this invention. Addition of the extraneous metal salt was at room temperature of about 18° C. Treated samples are charged to an autoclave, pressurized with hydrogen and agitated for various reaction times. Reduced liquor is pressure relieved, cooled and sampled, except in Example 14 wherein only half the reduced solution is blown down, the remainder (about 750 parts) is retained under the residual hydrogen pressure. Illustrative results are shown in the following Table II.

*Table II*

| Ex.-No. | Added Metal Ion | g./l. | Temp. (° C.) | $H_2$ Press. (p. s. i. g.) | Time (min.) | Filtrate, g./l. Ni |
|---|---|---|---|---|---|---|
| 11 | $Fe^{++}$ | 2 | 100 | 800 | 40 | 2.98. |
| 12 | $Mn^{++}$ | 2 | 150 | 800 | 60 | no reduction. |
| 13 | $Sn^{++}$ | 1.5 | 150 | 795 | 30 | 36.9. |
| 14 | $Cr^{++}$ | 0.5 | 100 | 800 | 17 | 0.1. |
| 15 | $Cr^{++}$ | 0.5 | 75 | 500 | 21 | 0.3. |
| 16 | $Cr^{++}$ | 0.5 | 75 | 700 | 9 | 0.3. |

EXAMPLE 17

Example 14 is repeated substituting about 0.5 g./l. of $Ti^{+++}$ ions for the $Cr^{++}$ ions. At a reduction temperature of 80° C. and under about 800 p. s. i. of hydrogen nickel reduction is substantially completed in 21 minutes.

EXAMPLE 18

Example 17 is repeated substituting an equivalent amount of vanadous chloride for the titanous chloride. At about 80° C. and under about 700 p. s. i. reduction is obtained in about 26 minutes.

EXAMPLE 19

Feed liquor contains 60 g./l. of Ni, 30 g./l. of $(NH_4)_2SO_4$ and an $NH_3/Ni$ mol ratio of about 2.5. To the residual pressurized half charge held in Example 14 as seed is added 750 parts of feed liquor. Resultant charge is reduced at about 82° C. under about 700 p. s. i. in a first densification. About 75% of reduced solution is discharged and replaced with additional feed liquor. This is repeated for a total of five densifications. Results are summarized in the following Table III.

*Table III*

| Densification No. | Aver. Temp. (° C.) | Aver. Press. (p. s. i. g.) | Time (Minutes) | Percent Nickel reduction |
|---|---|---|---|---|
| 1 | 82 | 700 | 11 | 99.8 |
| 2 | 82 | 700 | 15 | 99.6 |
| 3 | 82 | 700 | 12 | 99.7 |
| 4 | 82 | 700 | 16 | 99.8 |
| 5 | 80 | 700 | 15 | 99.5 |

After the fifth densification the product nickel powder analyzed 98.3% Ni with a chromium content of only 0.002%. Its apparent surface area was 1.85 sq. m./g.

As discussed above, the reduction time required is a function of both temperature and pressure, among other factors. Therefore in this case times of 30 minutes or less are considered satisfactory, longer times are not. To illustrate this feature, a series of tests were run on the chromous nucleated liquor of Example 14 for differing temperatures and pressures. Typical results are shown in the following Table IV.

*Table IV*

| Temp. (°C.) | $H_2$ Press. (p. s. i. g.) | Time (min.) | Reduction (percent) |
|---|---|---|---|
| 50 | 700 | 30 | 73 |
| 71 | 800 | 23 | 99.5 |
| 82 | 700 | 15 | 99.8 |
| 91 | 700 | 8 | 99.6 |
| 100 | 500 | 11 | 99.8 |
| 82 | 500 | 26 | 98.5 |
| 82 | 200 | 28 | 95.0 |

We claim:
1. In the hydrometallurgical precipitation of metal powder by treating an ammoniacal, ammonium salt solutions of dissolved metal salt with hydrogen at elevated temperatures and superatmospheric pressures, said metal being selected from the group consisting of nickel and cobalt, the improved low temperature reduction to produce metal powder which comprises: adjusting said solution to contain an NH₃ content sufficient to produce in a basic solution of at least pH 8 metal amines of the dissolved metal in which the ratio of mols of NH₃ to atoms of metal is at least about 1.7, adding thereto at least 0.1 g./l. of a soluble salt of an added polyvalent metal having an atomic number from 22–24 inclusive, said metal being in a lower valent state; at above about 50° C., subjecting resultant solution to pressure with sufficient hydrogen gas to produce at reduction temperature a positive partial overpressure; with agitation, maintaining so treated liquor at a reduction temperature below about 100° C., under said pressure until precipitation substantially ceases.

2. A process according to claim 1 in which the total pressure is maintained with hydrogen sufficiently high to produce at least 95% reduction in not more than thirty minutes.

3. A process according to claim 1 in which the pressure is maintained at above 50 p. s. i. g. but below about 1000 p. s. i. g. and the temperature is maintained at between about 70° and about 95° C.

4. A process according to claim 1 in which the added extraneous metal salt is a soluble chromous salt added in sufficient amount to maintain a $Cr^{++}$ ion content of from about 0.1 to about 0.5 g./l. until after gas reduction is initiated.

5. A process according to claim 1 in which the dissolved metal salt to be reduced is a nickel salt and the NH₃ content is adjusted to convert the dissolved nickel to an ammine having an NH₃/Ni ratio of from about 1.7 to about three.

6. A process according to claim 1 in which the dissolved metal salt to be reduced is a cobalt salt and the NH₃ content is adjusted to convert the dissolved nickel to an ammine having an NH₃/Co ratio of from about 2.8 to about six.

7. In the hydrometallurgical precipitation of metal powder by treating an ammoniacal, ammonium salt solutions of dissolved metal salt with hydrogen at elevated temperatures and superatmospheric pressures, said metal being selected from the group consisting of nickel and cobalt, the improved low temperature reduction to produce metal powder which comprises: adjusting said solution to contain an NH₃ content sufficient to produce in a basic solution of at least pH 8 metal ammines of the dissolved metal in which the ratio of mols of NH₃ to atoms of metal is at least about 1.7, adding thereto at least 0.1 g./l. of a soluble salt of an added polyvalent metal having an atomic number from 22–24 inclusive, said metal being in a lower valent state; in the presence of sufficient reducing agent to prevent oxidation of the added polyvalent metal to its higher valent state before initiation of gas reduction, at above about 50° C., subjecting resultant solution to pressure with sufficient hydrogen gas to produce at reduction temperature a positive partial overpressure; with agitation, maintaining so treated liquor at a reduction temperature below about 100° C., under said pressure until precipitation substantially ceases.

8. In the hydrometallurgical precipitation of metal powder by treating an ammoniacal, ammonium salt solutions of dissolved metal salt with hydrogen at elevated temperatures and superatmospheric pressures, said metal being selected from the group consisting of nickel and cobalt, the improved low temperature reduction to produce metal powder which comprises: adjusting said solution to contain an NH₃ content sufficient to produce in a basic solution of at least pH 8 metal ammines of the dissolved metal in which the ratio of mols of NH₃ to atoms of metal is at least about 1.7, adding thereto at least 0.1 g./l. of a soluble salt of an added polyvalent metal having an atomic number from 22–24 inclusive, said metal being in a lower valent state; at above about 50° C., subjecting resultant solution to pressure with sufficient hydrogen gas to produce at reduction temperature a positive partial overpressure; in the presence of a sufficient amount of powdered product metal to prevent oxidation of the added polyvalent metal to its higher valent state before initiation of gas reduction; with agitation, maintaining so treated liquor at a reduction temperature below about 100° C., under said pressure until precipitation substantially ceases.

9. A process according to claim 8 in which the metal salt to be reduced is a cobalt salt and reduction is initiated in the presence of from about one to about ten grams per liter of powdered cobalt.

No references cited.